REMOTELY ACTUATED CONTROL SYSTEM

Original Filed Oct. 4, 1961 2 Sheets-Sheet 1

INVENTOR
Walter S. Druz
BY Francis W. Crotty
ATTORNEY

Feb. 1, 1966 W. S. DRUZ 3,233,152

REMOTELY ACTUATED CONTROL SYSTEM

Original Filed Oct. 4, 1961 2 Sheets-Sheet 2

INVENTOR
Walter S. Druz
BY Francis W. Crotty
ATTORNEY 3,233,152

REMOTELY ACTUATED CONTROL SYSTEM

Walter S. Druz, Bensenville, Ill., assignor to Zenith Radio Corporation, Chicago, Ill., a corporation of Delaware Continuation of application Ser. No. 142,885, Oct. 4, 1961. This application Mar. 18, 1964, Ser. No. 353,652
1 Claim. (Cl. 317—147)

This invention is directed to a remote control system and more particularly to such a system which includes transistor devices. This application is a continuation of a copending application of Walter S. Druz, Serial No. 142,885, filed October 4, 1961, and assigned to the present assignee.

The use of remote control systems for selectively accomplishing any of a plurality of functions at a controlled or satellite station in response to command signals originated at a remotely located controlling station is now well known. Familiar household uses of such systems include the control of radio and television receivers, garage doors and other mechanisms. In industry, the control of work-handling devices, furnaces, metal-working apparatus and other structures is common. It is convenient to consider the inventive arrangement in a remote control system for regulating a television receiver.

A remote control system for radiating a particular command signal and adjusting one of several operating characteristics of a television receiver installed in the home in accordance with a particular received signal is the subject of United States Letters Patent 2,817,025, issued December 17, 1957, to Robert Adler and assigned to the assignee of the present invention. As there described, four different command signals are generated at the transmitter and selectively propagated to the receiver. Each command signal is of a different frequency; the four command frequencies are grouped within a narrow portion of the frequency spectrum. The control chassis has a correspondingly narrow acceptance bandwidth and therefore is relatively free from the influence of interfering signals of other frequencies which may be present at the receiver location. By assigning a different frequency to each of the command signals and by employing frequency selective channels in the receiver, it is possible to determine at the receiver location exactly which of the several functions is to be controlled.

As taught in detail in the Adler patent, this determination is effected by means of segregation networks. Each of two segregation networks utilized in a four-signal system functions to discriminate between two of the command signals by utilizing a resonant circuit tuned to the center frequency of those two signals, and discriminating means coupled to the output of this resonant circuit to make an exact determination of whether the received command signal is above or below the center frequency. It is convenient to consider this action in connection with a remote control system wherein only two command signals are radiated and detected; accordingly, the present invention will be described as related to such a system.

A pronounced trend in television receiver design is the reduction of physical size, and to abet this trend, it is desirable to simplify the circuitry and reduce component size as much as practicable without debilitation of receiver quality. Of course, if a remote control unit is included within the television receiver, it should also be miniaturized. Because the manufacture of transistors has not yet progressed to the level of precision and reproducibility already attained in the vacuum tube art, it has proved difficult to construct a transistorized control system in which the varying parameters of transistors, especially their gain, do not cause unwanted variations in the system operation.

It is therefore a principal object of the invention to provide a more compact but equally reliable remote control system.

It is a further object of the invention to achieve additional operating economies in such a compact system.

Yet another object of this invention is to provide a novel transistorized remote control system.

It is a particular object of the invention to provide a transistorized switching arrangement for such a remote control system in which variations of system operation with variations of the gain characteristics of transistors are minimized.

A remotely actuated control system, constructed in accordance with the invention comprises a transducer for receiving a control signal which may be subject to a wide range of signal intensities. An amplitude limiter is coupled to the transducer for developing therefrom a control signal of substantially constant amplitude. A transistor having input, output, and common electrodes is provided which has a predetermined threshold level of conduction. Passive circuit elements couple the limiter to the transistor, the elements including an input circuit coupled to the input and common electrodes and including a load impedance, a tuned circuit responsive to the control signal for developing an actuating signal and a bias resistor series connected to the load impedance and located circuitwise to provide a bias on the input electrode. The conductive threshold level of the transistor is stabilized by means including a bias resistor and a source of uni-directional potential directed across the bias resistor to provide a current flow through the resistor to produce a bias voltage on the transistor which normally places it in a non-conductive state. This bias resistor in response to the current from the uni-directional voltage source simulates a reverse bias source which in conjunction with the load impedance absorbs a major portion of the power of the output signal from the tuned circuit to stabilize the conduction threshold of the transistor and in addition, the resistor is of such a low magnitude that the bias of the input electrode varies only as a second order effect with conduction in the transistor. Relay means coupled to the transistor output electrodes perform a control function in response to the receipt of a control signal.

The features of the present invention which are believed to be novel are set forth with particularity in the appended claim. The organization and manner of operation of the invention, together with further objects and advantages thereof, may best be understood by reference to the following description taken in connection with the accompanying drawings, in the several figures of which like reference numerals identify like elements, and in which:

Figure 1:
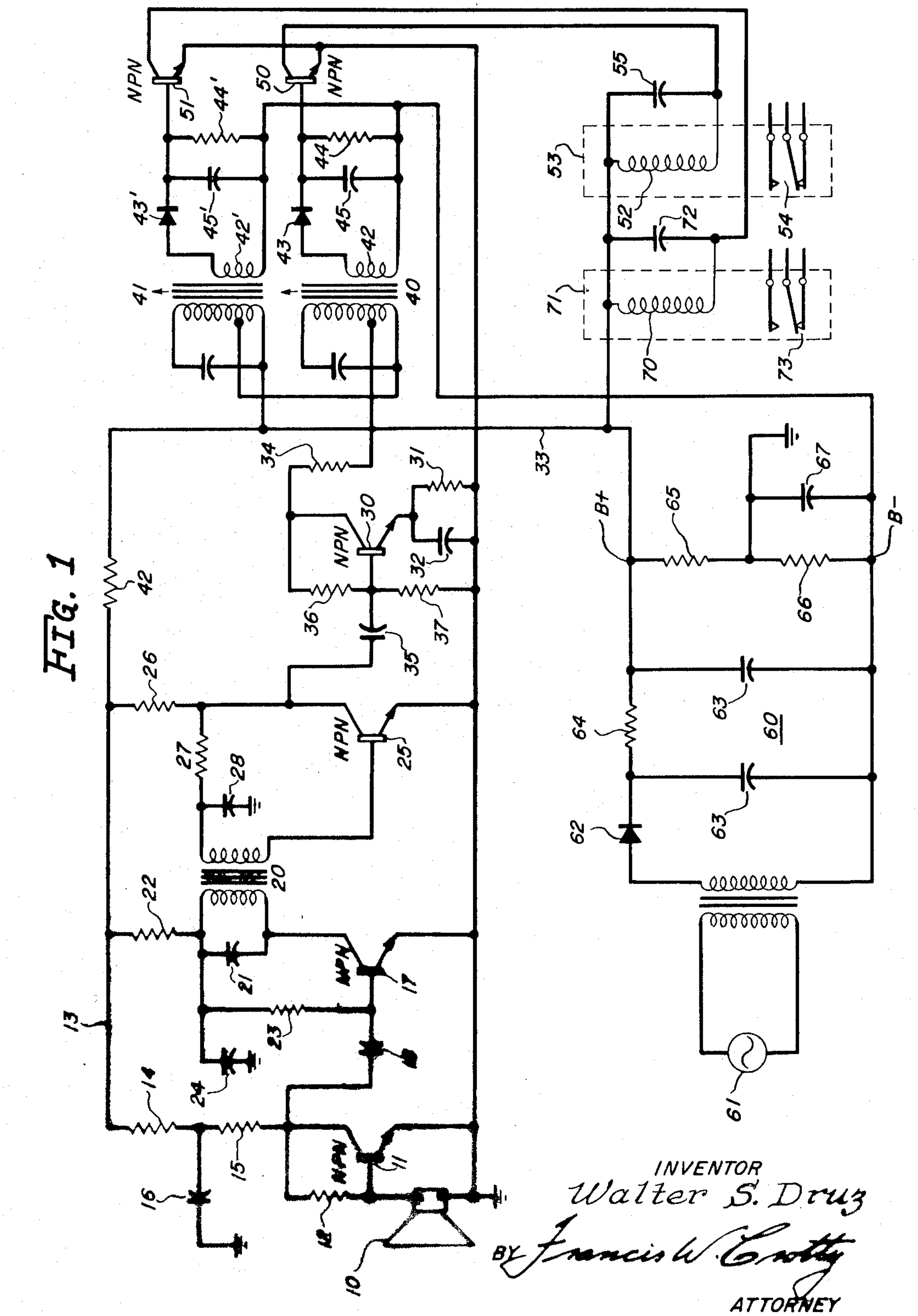
FIGURE 1 is a schematic diagram of a remotely actuated control system including one embodiment of the invention.

As earlier stated, the remote control system is actuated in response to a transmitter which issues a command signal of a particular frequency. The present invention is not concerned in any way with the details or mode of operation of the transmitter which, for that reason, has not been shown and will not be described. Obviously, the transmitter may be a pulse-modulated oscillator developing a signal of a selected frequency for radiation to the receiver or, preferably, it may be mechanical in nature, featuring a longitudinal-mode transmitter which is excited to generate and radiate a signal of supersonic frequency. Details of such a preferred transmitter are described and claimed in Patents 2,821,954, 2,821,955 and 2,821,956 all of which issued on February 4, 1958, and are assigned to the assignee of the subject invention.

It will be appreciated that the transmitter must be capable of generating several commands of distinctly different frequencies. The number of different commands is determined by the number of functions desired to be accomplished by the control system. For optimum remote control of a television receiver the usual arrangement employs four different command signals but, as indicated above, for convenience of the present description the system to be considered is restricted to one making use of a pair of command signals. Accordingly, the transmitter to function in controlling the receiver arrangement of FIGURE 1 must have the capabilities of developing but a pair of command signals of appropriate frequency.

Considering now more particularly the receiver itself, it comprises a transducer 10 for receiving an actuating signal issued by the remotely located transmitter. Since the distance from transmitter to receiver, in the usual installation, may vary widely at the will of the user, the signal picked up by transducer 10 is subject to a wide range of signal intensities. The transducer converts the received radiation into an electrical signal. This is a well-known function and may be accomplished by any of a variety of microphones, details of which need not be recited here.

An amplitude-limiter is coupled to the transducer or microphone 10 for developing therefrom a control signal of substantially constant amplitude. As represented, this is a three stage amplifier succeeded by a limiter and in each case employing a transistor.

The first transistor 11 has a grounded emitter and its collector is coupled through a feedback path including a resistor 12 to the base. The base is also connected to the high potential terminal of microphone 10. An operating potential for the collector is supplied from a positive potential bus 13 through a pair of series-connected resistors 14, 15 having a common junction bypassed to ground by a capacitor 16.

The second stage of amplification likewise includes a grounded emitter transistor 17 having a base coupled through a coupling condenser 18 to the collector electrode circuit of the preceding stage. The collector circuit of the second stage includes the primary winding of an interstage coupling transformer 20 wihch is tuned by a condenser 21. The primary circuit of the transformer is resonant at a frequency midway of the frequencies of the two command signals employed to actuate the control system and the design of the transformer with its associated circuitry is employed to impart a desired frequency selectivity to the amplifier, selective in respect of bandwidth. The microphone 10 oftentimes has such a wide acceptance band as to admit unwanted or spurious signals as well as the desired command signals and protection of the system against inadvertant or spurious actuation by such undesired signals is accomplished by confining the band to which the amplifier responds through appropriate design of the coupling transformer. The collector of transistor 17 is energized from bus 13 by means of a dropping resistor 22 and the primary winding of the intercoupling transformer. The collector is connected to the base through a resistor 23 which is also connected to ground through a decoupling condenser 24.

The thrid stage of the amplifier is quite similar to the first, including a transistor 25 connected with a grounded emitter. The collector is energized from bus 13 through a dropping resistor 26 and is connected to the base through a resistor 27 and the secondary of the interstage transformer 20. Condenser 28 is also here provided for decoupling purposes.

The limiter which is driven from the three-stage amplifier includes a transistor 30 having an emitter coupled to ground through a biasing network comprising a resistor 31 and a shunt-connected capacitor 32. The collector is energized from a bus 33, being connected thereto by means of a resistor 34 and a tapped portion of the primary winding of each of a pair of coupling transformers 40 and 41. Bus 33 connects with bus 13 through a dropping resistor 42. The collector electrode of the limiter is coupled through a capacitor 35 to the collector circuit of the final stage of the amplifier. The base is likewise connected to the collector through a resistor 36 and to the emitter through a resistor 37 and the bias network 31, 32. Thus, the instantaneous bias potential of the base varies as a function of the level of the input signal to the limiter.

As previously indicated, the collector circuit of limiter transistor 30 includes the primary windings of coupling transformers 40, 41 connected in series. Each winding is tuned by a condenser as indicated and frequency selection or segregation and channeling of the command signals is accomplished by this tuning. More specifically, the primary winding of interstage transformer 40 is resonant to one of the command signals and the primary winding of the other transformer 41 is tuned or resonant to the other of the command signals to the end that, in response to a particular command, a peak response is obtained from only one of the transformers. The connection of the collector of the limiter 30 to a tap on each transformer winding is for impedance matching purposes and the circuitry is chosen, at the same time, to acquire a high Q and high selectivity.

Limiting of the amplified command signal is accomplished on half cycles of one polarity by cut off or nonconduction in transistor 30 and on half cycles of the opposite polarity by current saturation in the collector circuit.

The signal translated from microphone 10 through the limiter is a supersonic signal and it is detected or rectified by rectifiers associated with transformers 40, 41. Since the detector circuits are identical, their component parts bear similar reference characters.

One detector, for example, includes a secondary winding 42 of coupling transformer 40 and a diode 43. The diode detector has a load impedance for developing a rectified control signal, that load impedance taking the usual form of a resistor 44 and a shunt-connected capacitor 45.

Each detector is associated with a switching transistor circuit through which a relay is operated in response to conduction in the switching transistor. One such switching transistor is designated 50 and the other 51. The collector circuit of transistor 50 includes the operating winding 52 of a relay 53, the operation of which controls a family of contacts 54. The relay winding is shunted by a capacitor 55 which assists in preventing the building up of an induced voltage in coil 52 when the energizing current therein is interrupted. This is desirable in that it minimizes the tendency to cause spurious actuation of the relay at the conclusion of a control pulse and also prevents collector punch through. The collector circuit is completed from relay 53 to the positive terminal of a power supply 60.

In similar fashion, the collector circuit of switching transistor 51 concludes the winding 70 of a relay 71 which winding is bypassed by a capacitor 72. The contacts controlled by this relay are designated 73.

Figure 2:
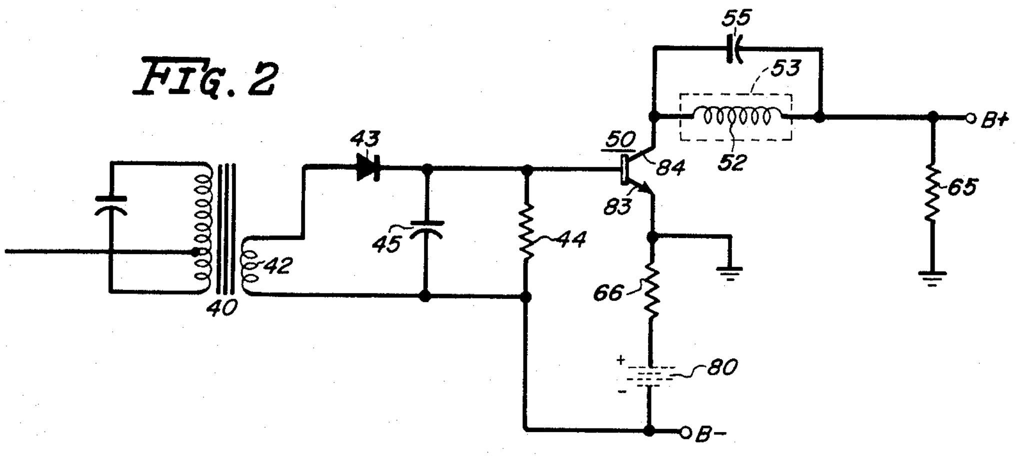
FIGURE 2 is a diagram of a selected portion of the arrangement of FIGURE 1, reproduced for convenience of explanation.

The power supply 60 is energized from any commercial source represented by the generator 61. This generator is transformer-coupled to a rectifier 62 which has the usual resistance capacitance load circuit for developing unidirectional operating potentials. The load circuit has shunt-connected filter capacitors 63 and a resistor 64 which is in series across the rectifier with another pair of resistors 65, 66. The junction of resistors 65, 66 is grounded and capacitor 67 is a bypass for the command signal frequencies. Because of the ground connection, it is apparent that the power-supply terminal designated B— is of negative polarity. There are important considerations anent the circuits including switching transistors 50, 51 which contribute highly desirable and improved operating characteristics to the described remote control system. The details of these features will be considered hereinafter in connection with the fragmentary showing of FIGURE 2 and after a summary resume of the overall system operation.

In considering the operation of the remotely actuated control system of FIGURE 1, it will be assumed that the primary windings of transformers 40 and 41 have been properly tuned to effect a selection and segregation of the two control signals of distinctly different frequencies originating at a remote transmitter for the purpose of controlling the system. In stand-by operation, that is after the power supply has been turned on but before a command has been received, switching transistors 50, 51 are non-conductive and the windings of control relays 53, 71 are de-energized.

When a command signal is radiated in response to actuation of the remote transmitter, it is intercepted by microphone 10 and converted into an electrical signal which is applied to the base-emitter circuit of the first stage 11 of the three-stage amplifier. After successive amplification in stages 11, 17 and 25, the signal is limited in the stage including transistor 30. The limited signal which appears in the collector circuit of transistor 30 has a substantially constant amplitude even though the applied signal may vary widely. This constant amplitude signal for application to detectors 43, 43' results from the limiting function. It will be appreciated that the limiting may be augmented or, if desired, even superseded by a suitable automatic gain control system although limiting is preferred. Depending upon the frequency of the particular command signal that has been received, a usable response is obtained from either transformer 40 or 41. This response is detected in the associated one of detectors 43, 43' and is applied to the associated one of switch transistors 50 and 51. The applied signal causes the transistor switch to conduct and energize the particular one of relays 53, 71 included in the collector circuit of the conductive transistor. As a consequence, one of the family of contacts 54, 73 is actuated and a control function is achieved.

The type control that is accomplished is of no particular moment to the subject invention but it should be noted in passing that a variety of work circuits may be operated. When the system controls a television receiver, for example, one set of contacts may energize the tuning motor of the controlled receiver for channel selection. The other may conveniently control a muting or volume adjustment.

The system is well protected against inadvertent actuation. The bandwidth imposed by interstage transformer 20 restricts the acceptance of the system to the small portion of the frequency spectrum in which the command signals are located. It is recognized that, from time to time, a spurious signal may be received within the acceptance band and such spurious signals are often strong but they are limited in amplitude by limiter stage 30. This protects against transient impulses of short duration even though the impulses are relatively large in magnitude. Further protection of this sort is provided by the detector load circuits 44, 45 which will be recognized as integrators. The signal that each applies to the base electrode of the switching transistor with which it is connected achieves a threshold or minimum level required to cause the transistor to conduct only if the signal delivered to the rectifier from the preceding limiter endures for a minimum period of time.

More detailed consideration will now be given to the circuitry of the switching transistors which represents a novel approach for maintaining a substantially constant threshold level for operating the switching transistors in spite of the fact that common experience shows the gain characteristics of such transistors to be subject to considerable variation. For this purpose, reference is made to FIGURE 2 which is a reproduction of the circuitry of detector 43 and switching transistor 50 but it will be understood that what is to be said concerning this circuit applies equally to the companion circuit of detector 43' and switching transistor 51.

Limiter stage 30 is coupled to transistor 50 by means consisting of passive circuit elements only. These elements include the input circuit of the switching transistor which comprises load impedance 44 and which is coupled to limiter 30 through detector 43 and tuned coupling transformer 40. The input circuit further includes a bias resistor 66 the impedance of which is very small relative to that of detector load impedance 44. These two resistors 44 and 66 are series-connected with the bias resistor 66 located circuitwise to provide degeneration. In other words, resistor 66 is in the emitter circuit common to both the input and output circuits of the switching transistor.

There is a bias network provided for the switching transistor including the same bias resistor 66 in a circuit that may be traced from ground through resistor 65 through the power supply and resistor 66. Current flow through this circuit establishes a bias potential which serves normally to maintain the transistor non-conductive. As is well understood in circuit theory, one may represent the circuit as a resistor 66 in series with a battery having a terminal voltage of the same magnitude as that which is developed by the flow of the bias current through the resistor. In other words, the bias voltage developed across resistor 66 simulates a reverse-bias source in the emitter circuit and, for convenience, the simulated bias source 80 is represented in broken-line construction in FIGURE 2. Its polarity is shown as required to establish a reverse bias on the base electrode.

Moreover, the magnitude of the simulated bias source is such that the bias of the transistor varies only as a second order effect with conduction in the transistor. This of course is accomplished by suitably adjusting the impedance of the biasing network so that even though the degenerative resistor 66 is of itself a small impedance, the bias current is sufficiently large that the emitter bias is only secondarily affected by conduction of the transistor. It will be appreciated that in the presence of a signal in the input circuit of transistor 50 of sufficient magnitude to exceed the threshold of conductivity the transistor is rendered conductive and current flow in the base-emitter circuit is in a direction opposed to the polarity designation of simulated bias source 80. This source then constitutes a power drain in the input circuit which, in conjunction with the power drain represented by load impedance 44, absorbs the major portion of the power represented by the input signal delivered from the amplitude-limiter, through detector 43, to the input of the transistor. Where this circuit condition is satisfied, the power drain represented by the internal base to emitter impedance of the switching transistor and the power drain represented by the small degenerative resistor 66 is very minor compared to that represented by the simulated bias source 80 and load impedance 44. Under these conditions, the threshold level of applied signal for effecting conduction in the switching transistor is found to be substantially independent of the gain characteristic of the transistor. Accordingly, transistor 50 may be replaced from time to time and even though the gain may vary over a significant range of values, the switching circuit exhibits a substantially constant threshold level for actuation. This obviously is highly desirable in maintaining prescribed operating conditions within the system. Thus, the conductive threshold level of the transistor is stabilized by means including bias resistor 66 and its source of unidirectional potential represented by B+. Moreover this is achieved without the need of any intermediate active circuit element between the limiter and switching stages.

What has just been described will be understood to be in the nature of a stabilizing phenomenon which maintains uniformity of operation. It distinguishes itself significantly from the prior art as a mechanism by which stabilization is achieved. Heretofore stabilization has been accomplished by the use of a degenerative resistor of a relatively high impedance but that is an undesirable approach for an installation of the type under consideration because of the undesirably high power demands it imposes on the system. The arrangement of FIGURE 2 features the use of a degenerative resistor 66 of very low impedance, low with respect to load impedance 44 and also with respect to the impedance of the collector circuit.

It may be shown that in the described system freedom from variation in operating parameters with variations in the gain characteristics of the switching transistors is reduced by a factor roughly equivalent to the total input power applied to the switch circuit divided by the portion of that power consumed by the internal base-emitter impedance of the transmitter. By having the preponderant power sink represented by the simulated bias source 80 and the detector load impedance 44, a most significant measure of relief from gain variations of the switching transistors is afforded.

One representative set of parameters employed in the described circuit of the switching transistor is listed below by way of illustration:

| | | |
|---|---|---|
| Transistor **82** | | Type 2N306 |
| Resistor **44** | ohms | 10,000 |
| Resistor **66** | do | 12 |
| Capacitor **45** | microfarads | 100 |
| Capacitor **55** | do | 3 |
| Capacitor **67** | do | 0.05 |
| Potential of bus **33** (B+) | volts | +20 |
| Potential of B− | do | −0.7 |
| Impedance of relay **53** | ohms | 700 |

The switching transistor circuitry is not restricted to the use of a three-element device. Four-layer or thyratron transistors may also be employed as shown in FIGURES 3 and 4.

Figure 3:
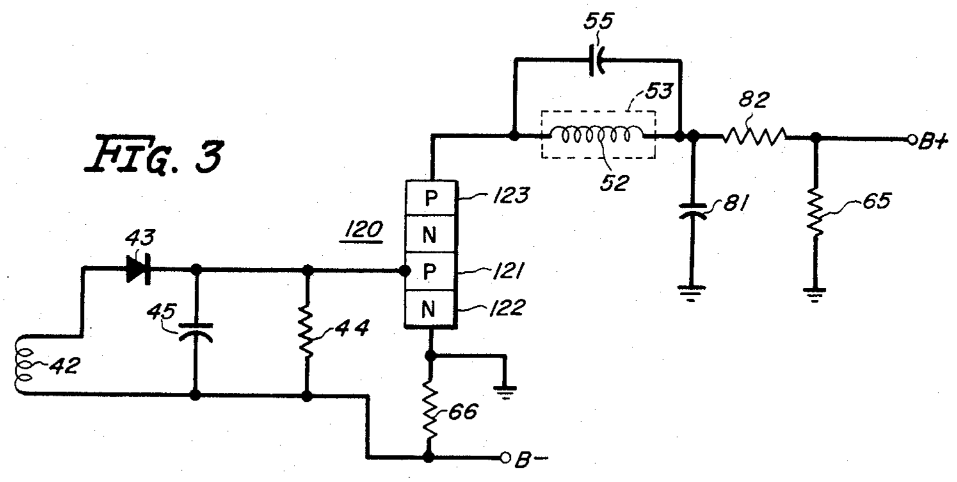
FIGURES 3 and 4 are schematic diagrams of modifications that may be made to portions of the system of FIGURE 1.

In FIGURE 3 the switch device is a PNPN transistor in which electrode 121 serves as the input while electrode 122 is common to the input and output circuits. The output electrode is designated 123 and is connected to the relay winding 52. The circuit also includes a network comprising a shunt condenser 81 and a series resistor 82 connected to the B+ terminal.

In this embodiment, capacitor 81 is charged through resistor 82 from the B+ bus. A received command signal applied to the input circuit of the switching transistor renders the transistor conductive and conduction is maintained until capacitor 81 discharges through the transistor. At that time conduction ceases provided that resistor 82 is large enough to limit current below the so-called valley point of the thyratron transistor. Capacitor 81 must be large enough that the energy which it delivers upon its discharge through the switching transistor is adequate to operate the relay.

Figure 4:
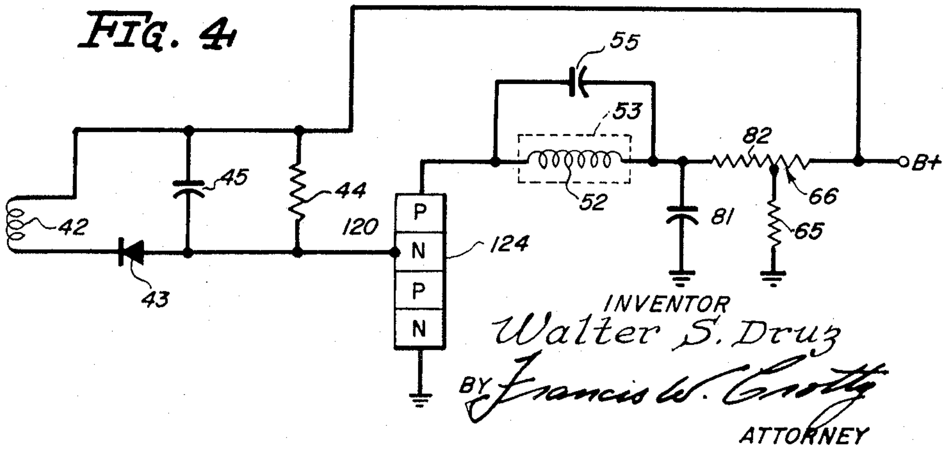

The arrangement of FIGURE 4 is similar to that of FIGURE 3 except that in this instance the input circuit connects to the penultimate electrode 124. Also, biasing resistor 66 is now connected in series with resistor 82 to the positive bus. The connections illustrated provide the appropriate bias so that the switching transistor, in the absence of a control signal from the amplitude-limiter, is biased to its non-conductive state. The presence of a command signal renders the transistor conductive and the operation from thereon is similar to that of FIGURE 3.

While particular embodiments of the invention have been shown and described, it will be obvious to those skilled in the art that changes and modifications may be made without departing from the invention in its broader aspects, and, therefore, the aim in the appended claim is to cover all such changes and modifications as fall within the true spirit and scope of the invention.

I claim:

A remotely actuated control system comprising:

a transducer for receiving a command signal which may be subject to a wide range of signal intensities;

an amplitude-limiter coupled to said transducer for developing a control signal of substantially constant amplitude;

a transistor having input, output and common electrodes and a predetermined threshold level of conduction;

means consisting of passive circuit elements for coupling said limiter to said transistor, said passive circuit elements including an input circuit coupled to said input and common electrodes and including a load impedance, a tuned circuit responsive to said control signal for developing an actuating signal, and a bias resistor series connected to said load impedance and located circuitwise to provide a bias on said input electrode;

means for stabilizing the conductive threshold level of said transistor including said bias resistor and a source of unidirectional potential connected across said bias resistor to provide a current flow through said bias resistor to produce a bias voltage on said transistor to normally place it in a non-conductive state;

said bias resistor in response to said current from said unidirectional voltage source simulating a reverse bias source which in conjunction with said load impedance absorbs a major portion of the power of said output signal from said tuned circuit to stabilize said conduction threshold of said transistor and in addition is of such a low magnitude that said bias of said input electrode varies only as a second order effect with conduction in said transistor;

and relay means coupled to said transistor output electrodes whereby a control function is performed in response to receipt of a control signal.

References Cited by the Examiner

UNITED STATES PATENTS

| | | | |
|---|---|---|---|
| 2,923,918 | 2/1960 | Adler | 340—171 |
| 3,051,847 | 8/1962 | Niemeyer | 317—148.5 |

SAMUEL BERNSTEIN, *Primary Examiner.*